Aug. 17, 1971 M. BERKENBLIT ET AL 3,600,242

PROCESS FOR FORMING ELECTRICALLY STABLE DOPED EPITAXIAL LAYERS

Filed Oct. 3, 1968 2 Sheets-Sheet 1

INVENTORS
MELVIN BERKENBLIT
THOMAS B. LIGHT
ARNOLD REISMAN

BY Thomas J. Kilgannon Jr.
ATTORNEY 3,600,242

PROCESS FOR FORMING ELECTRICALLY STABLE DOPED EPITAXIAL LAYERS

Melvin Berkenblit and Arnold Reisman, Yorktown Heights, and Thomas B. Light, Chappaqua, N.Y., assignors to International Business Machines Corporation, Armonk, N.Y.

Filed Oct. 3, 1968, Ser. No. 764,863
Int. Cl. H01l *7/36;* H01b *13/06*
U.S. Cl. 148—175 13 Claims

ABSTRACT OF THE DISCLOSURE

A process which stabilizes the resistivity of an epitaxially grown layer of germanium doped with p-type impurities and deposited in a low temperature open tube disproportionation system from a germanium halide specie under surface limited condition is disclosed. When p-type dopants are deposited along with germanium in a surface limited node, heating subsequent to deposition to higher temperatures than the deposition temperature brought about changes in resistivity resulting in inoperable devices or devices having poor characteristics. The resistivity changes can be overcome by a post-deposition anneal alone or by adjusting deposition parameters, such as growth rate and substrate temperature in conjunction with annealing.

BACKGROUND OF THE INVENTION

Field of the invention

The invention relates generally to methods for depositing epitaxially a semiconductor material on a substrate. More specifically, it relates to a method for depositing epitaxially mirror smooth and shiny germanium doped with p-type impurities in a low temperature disproportionation system under conditions of germanium halide and dopant concentrations and flow velocities which cause the resulting deposition to be surface limited rather than mass transport limited. Using p-type dopants, instabilities are evidenced by a change in resistivity which can be eliminated by heat treating alone or by adjusting growth rates and substrate temperatures to achieve a minimum departure from desired values of resistivity and then heat treating to eliminate the remaining instability.

DESCRIPTION OF THE PRIOR ART

Epitaxial deposition of germanium via disproportionation reactions both from a high temperature source to a low temperature deposition site and from a low temperature source to a high temperature deposition site have been known for a number of years. More recently, the literature has described the epitaxial deposition of germanium in open tube systems wherein the deposition of germanium at a deposition site is controlled by introducing hydrogen or hydrogen and an inert gas in given mole fractions at the germanium source. Other recent literature has described a technique for enhancing the efficiency of deposition of germanium by introducing excess hydrogen or hydrogen and an inert gas in given mole fractions at the deposition site. In addition, the recent literature has described a technique in the open tube regime which allows the pyrolytic decomposition of a dopant compound simultaneously with the deposition of germanium from a germanium halide specie without affecting the efficiency of deposition of the germanium. These teachings have been covered in the following issued patents which are assigned to the same assignee as the present invention:

U.S. Pat. No. 3,345,223, entitled "Epitaxial Deposition of Semiconductor Materials," issued on October 3, 1967, in the names of Arnold Reisman, Melvin Berkenblit, Satenik A. Papazian, and George Cheroff describes the epitaxial deposition of germanium in an open tube system wherein the deposition of germanium is controlled by the introduction of inert gas or hydrogen and an inert gas at the germanium source.

U.S. Pat. No. 3,354,004 entitled "Method for Enhancing Efficiency of Recovery of Semiconductor Material in Perturbable Disproportionation Systems," issued on Nov. 21, 1967, in the names of Arnold Reisman, Melvin Berkenblit, and Satenik A. Alyanakyan describes the enhancement of efficiency of deposition of germanium in an open tube system from a germanium halide specie by introducing excess hydrogen or hydrogen and an inert gas at the deposition site.

U.S. Pat. No. 3,361,600, entitled "Method of Doping Epitaxially Grown Semiconductor Material," issued on Jan. 2, 1968, in the names of Arnold Reisman and Melvin Berkenblit describes the simultaneous disproportionation of a germanium halide specie and the pyrolytic decomposition of a dopant compound without affecting the efficiency of deposition of germanium.

In all of the above mentioned applications, the reactions involved, both at source and deposition site, have been carried out under conditions which tend toward equilibrium conditions. Conditions of germanium halide concentration and velocity are such that the deposition of germanium tends to be mass transport limited, that is, the amount of germanium deposited is a function of the amount of germanium delivered to the deposition site.

While the techniques described in the above mentioned patents provided a large degree of control in the open tube low temperature disproportionation system, the quality of germanium deposits when compared with prior art high temperature processes such as the hydrogen reduction of $GeCl_4$ on Ge substrates left something to be desired and, all the advantages resulting from the ability to deposit germanium at relatively low temperatures could not be realized.

A technique described in a co-pending application assigned to the same assignee as the present invention entitled "Semiconductor Preparation and Deposition Process," filed on Oct. 11, 1967, Ser. No. 674,471, in the names of Melvin Berkenblit and Arnold Reisman permits one to obtain depositions which are comparable to those obtained from high temperature reduction processes. This is accomplished by a substrate preparation technique and by a deposition technique which tends to be surface limited rather than mass transport limited. The preparation technique includes a chemical treatment step to remove surface films, rapid quenching, rinsing and drying steps, and a heating step prior to deposition. Deposition of germanium is carried out in an open tube disproportionation system by introducing a germanium halide specie which is capable of disproportionating at a deposition site along with a p- or n-type dopant in concentrations and at velocities such that the deposition of germanium tends to be surface limited rather than mass transport limited. The resulting deposition is smooth and shiny and of a quality comparable to that obtained from prior art high temperature reduction processes. Both n and p-type epitaxial layers are obtainable having any desired concentration of either dopant.

In the course of further processing to provide diode and transistor devices, anomalous behavior was discovered in devices fabricated using epitaxial layers into which p-type dopants had been introduced. Fabrication of diodes and transistor devices incorporates processing steps, such as diffusing, which are carried out at temperatures which are higher than the epitaxial deposition temperature. Such processing apparently caused an internal rearrangement of the p-type dopant in the epitaxial layer resulting in p-n junction shorts and poor electrical characteristics in devices fabricated from the p-doped layers. The present invention defines the conditions for depositing p-doped epitaxial germanium layers which permit deposition under conditions which tend to be surface limiting to achieve good surface qualities. The present invention also provides a minimum departure in resistivity from a desired resistivity and permits elimination of instabilities as evidenced by resistivity changes by an annealing step after deposition has been achieved.

SUMMARY OF THE INVENTION

The method of the present invention, in its broadest aspect, comprises the step of annealing a substrate having an epitaxially deposited p-doped layer of germanium on the surface thereof to remove latent instabilities which appear as the result of subsequent processing steps at temperatures higher than the deposition step. The epitaxial deposition of a p-doped germanium layer is carried out by introducing a germanium halide compound in the vapor phase which is capable of disproportionating at a deposition site along with a vaporized p-type dopant under conditions of flow and concentration of the germanium halide and substrate temperature such that deposition tends to be surface limited and such that the appearance of latent instabilities is minimized. The method, in its broadest aspect, also includes a step of preparing the surface of a previously polished semiconductor substrate or wafer prior to deposition to remove deleterious surface conditions and to prevent the occurrence of conditions at the surface which lead to the production of poor surfaces upon deposition.

In accordance with more particular aspects of the invention, a gallium arsenide or germanium substrate which has been previously polished is subjected to preparation steps which include: chemically treating the surface of the substrate by immersing it in an appropriate solubilizer for a time sufficient to remove accumulated surface contaminants; quenching the chemical action rapidly, rinsing the substrate while immersed in deionized water; drying the substrate in a stream of inert gas; introducing the substrate into the disproportionation system and disposing it face downward therein, heating the substrate in hydrogen to achieve a final cleaning and, depositing germanium from a disproportionatable germanium halide species under conditions of velocity and germanium halide concentration along with a vaporized p-type dopant which cause deposition of germanium to tend to be surface limited rather than mass transport limited. The resulting deposition is mirror smooth and shiny and latent instabilities are at a minimum. Annealing is then carried out for a time and temperature sufficient to bring the resistivity of the deposited p-doped epitaxial layer to a final stable value.

It is, therefore, an object of this invention to provide a method for depositing p-doped germanium epitaxially under conditions of germanium halide concentration, linear gas stream velocity and substrate temperatures such that the deposition of germanium is essentially surface limited and latent instabilities are reduced to a minimum.

Another object is to provide mirror smooth and shiny surfaces of epitaxially deposited p-doped germanium on substrates of germanium and gallium arsenide.

Still another object is to provide a method of substrate preparation which insures the formation of high quality surfaces of p-doped epitaxial films which when subjected to an annealing treatment are suitable for further processing in the manufacture of integrated circuits.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 1:
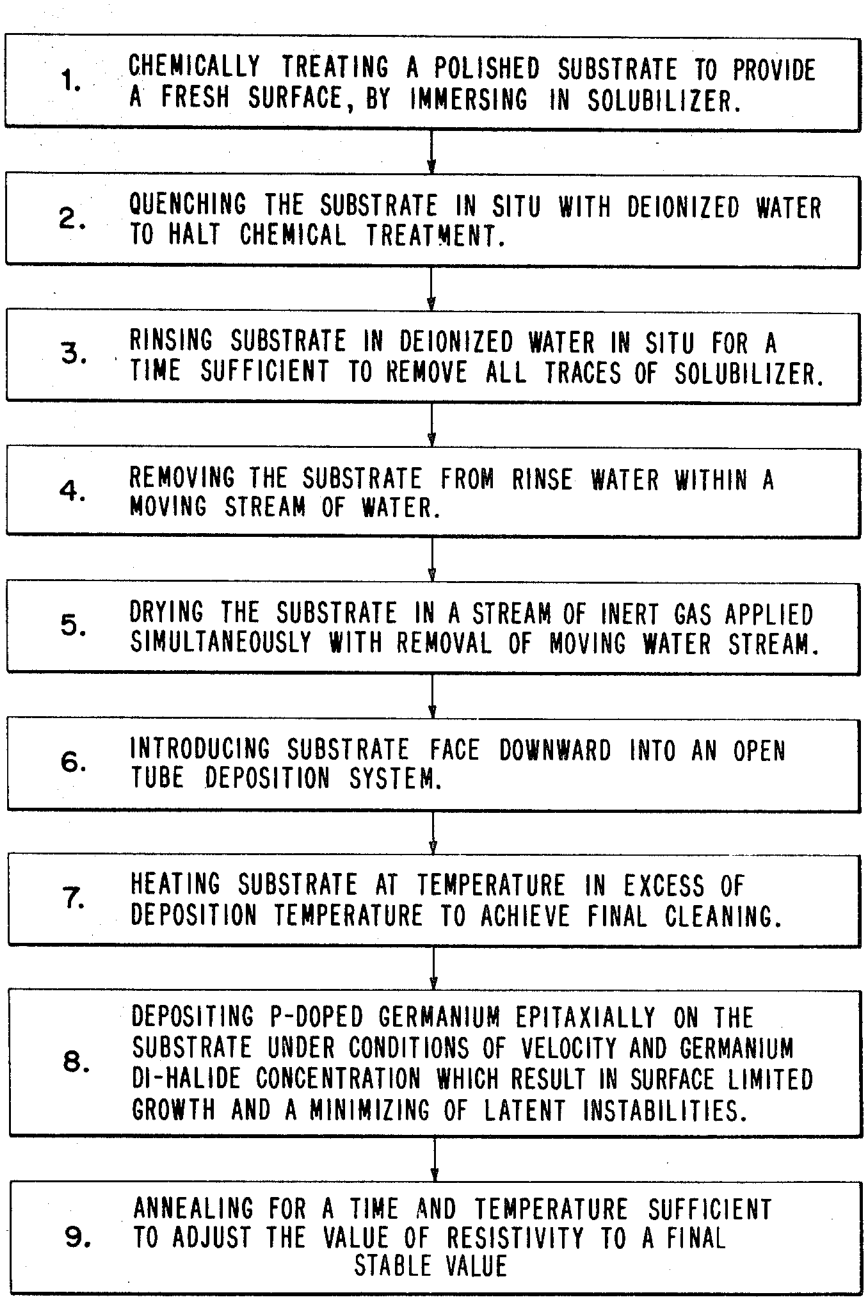
FIG. 1 is a flow chart diagrammatically outlining the steps utilized in practicing the method of the present invention.

Before addressing the preferred method of the present invention reference should be made to the U.S. Pat. No. 3,345,223, entitled "Epitaxial Deposition of Semiconductor Materials," issued on Oct. 3, 1967, mentioned hereinabove which discloses a method for depositing germanium from a perturbable germanium halide species by introducing mixtures of hydrogen and an inert gas or an inert gas alone at a germanium source during the formation of the germanium halide to provide variations in the efficiency of germanium pick-up and consequently in the efficiency of germanium deposition. Briefly, it was found that when different mole fractions of hydrogen and helium are provided at a given temperature at a germanium source along with a halogen or a halogen in halide form, it is possible to adjust the conditions of germanium pick-up and deposition so that maximum efficiency can be attained for the particular conditions chosen. The mole fraction of hydrogen and helium, specifically the ratio $$F=\frac{H_2}{(H_2+He)}$$

emcompasses the conditions where pure hydrogen, pure helium and all ratios between these conditions are utilized. In open tube systems of the type shown, the amount of germanium deposited is proportional to the amount picked up at the source bed, so changing conditions at the source by the introduction of different hydrogen-helium fractions changes the conditions at the deposition site. The effect of adding more helium at a germanium source bed is that conditions for the hydrogen halide remaining in the vapor phase are disturbed. As a result, the greater the quantity of helium introduced, the more germanium halide, germanium di-iodide, for example, is formed. The more di-iodide formed, the more will be deposited on the substrate at a deposition site when the germanium di-iodide disproportionates to pure germanium and germanium tetra-iodide at a lower temperature than the germanium source temperature. Where hydrogen is a constituent of the mixture, the partial pressure of hydrogen must at least be equal to the partial pressure of the halogen present. From the foregoing, it should be clear that equilibrium conditions are being maintained or closely approached at both source and deposition site. At the source, the velocity and concentration of the halogen are adjusted so that all the germanium which can be picked up is picked up, subject to control by the amount of helium introduced. At the deposition site, the germanium halide species disproportionates at a lower temperature and all the germanium which can be deposited is deposited because equilibrium conditions for the reaction $$2GeI_{2(v)} \rightleftarrows Ge_{(s)} + GeI_{4(v)}$$

are maintained or approached. Deposition of germanium of this character is said to be mass transport limited.

In a co-pending application entitled, "Semiconductor Preparation and Deposition Process" and referred to hereinabove, conditions of linear gas stream velocity and halogen or halide concentration at the source are adjusted such that equilibrium conditions are attained; that is, all the germanium which can be picked up is picked up. Thus, a disproportionable di-halide species is formed, the amount of the di-halide being controlled by the addition of helium to the hydrogen already present. At the deposition site, the di-halide species encounters a lower temperature, but, because of the rate at which the di-halide species is introduced and, because the residency time of the vapor at the substrate is not sufficiently long, equilibrium conditions are not attained and are in fact purposely avoided. Nevertheless, deposition of germanium takes place, and contrary to what might be expected from studies of systems which use low velocities and low iodine vapor pressures and which are consistent with transpiration studies and thermodynamic analysis of such systems, the system, of the co-pending application, using relatively high velocities and iodine vapor pressures, produces surface qualities which are markedly enhanced over those obtained by the low velocity and iodine vapor pressure system. A system wherein equilibrium conditions are not approached at the deposition site because of high velocities and low residency time of the vapor in the region of the substrate but, where deposition takes place, is a system wherein the deposition of germanium may be characterized as surface limited.

The point is to be appreciated from the foregoing is that while certain similarities exist between the present invention and that taught in the above mentioned patent and co-pending application, the conditions at deposition site are quite specific and are intended to minimize latent instabilities in the resulting p-doped epitaxial germanium. The preparation of the semiconductor substrate is identical with that described in the above-mentioned co-pending application. In view of this, substrate preparations will be described sufficiently herein to practice the invention. For a detailed description, reference should be made to the above identified co-pending application.

Referring now to FIG. 1, in accordance with preferred method steps as outlined therein in flow chart form, a mirror smooth, shiny, epitaxial film is deposited on a substrate as follows:

STEP 1

Chemically treating a polished substrate to provide a fresh surface.

A substrate of germanium or gallium arsenide which has been previously subjected to a polishing treatment is utilized for this step. In carrying out the chemical treating of the substrate which retains the original surface texture and planarity, a substrate of germanium or gallium arsenide is immersed in an appropriate solubilizer.

Using a gallium arsenide substrate, the substrate is immersed in a solution of $90H_2SO_4{:}5H_2O_2{:}5H_2O$ for five minutes. The solution is magnetically stirred during the chemical treating period.

Using a germanium substrate, a satisfactory cleaning action can be obtained by immersing the substrate in a 3:1 solution of $H_2O{:}NaOCl$ stock solution being ultrachlorine) for 90 seconds with the solution being ultrasonically agitated by means of an ultrasonic transducer during the chemical treating period.

As a result of the above step, any residues which may have remained on the surface after initially polishing the substrates are removed and the substrate should have a surface which is suitable for epitaxial deposition. However, simply removing the substrate from the solution has not been found to provide surfaces which result in mirror smooth, shiny epitaxial deposits. The substrate at the end of the chemical treatment period must be further treated.

STEP 2

Quenching the chemical action on the substrate in situ (while the substrate is still held in a receptacle and immersed therein in the solubilizing solution) by immersing the receptacle in a beaker of deionized water to halt the chemical action on the substrate.

STEP 3

Rinsing the substrate in situ in deionized water for a time sufficient to remove all traces of the solubilizer.

This step is accomplished by directing a stream of deionized water at the substrate for approximately five minutes; all the while maintaining the substrate immersed in the water which overflow sides of the receptacle of deionized water.

STEP 4

Removing the substrate from the rinse water within a moving stream of water preparatory to drying so that the substrate is substantially immersed during removal.

This step is accomplished by grasping the substrate with forceps or the like and removing it from the receptacle. During removal, the substrate is held within the moving stream of deionized water so that it is, in effect, still immersed in water.

STEP 5

Drying the substrate in a stream of inert gas which is applied simultaneously with the removal of the moving water streams.

This step is accomplished by quickly transferring the substrate from the moving water stream to a stream of nitrogen or other inert gas in such a way that the film of water held to the surface of the substrate by surface tension is blown off the substrate as a single droplet of water rather than as a number of smaller droplets which would tend to evaporate from the substrate. The removal of the water can best be accomplished by applying the stream of inert gas at a low angle relative to the surface of the substrate so that the gas stream pushes the water off without splashing.

STEP 6

Introducing the substrate face downward in an open tube disproportionation system.

Figure 2:
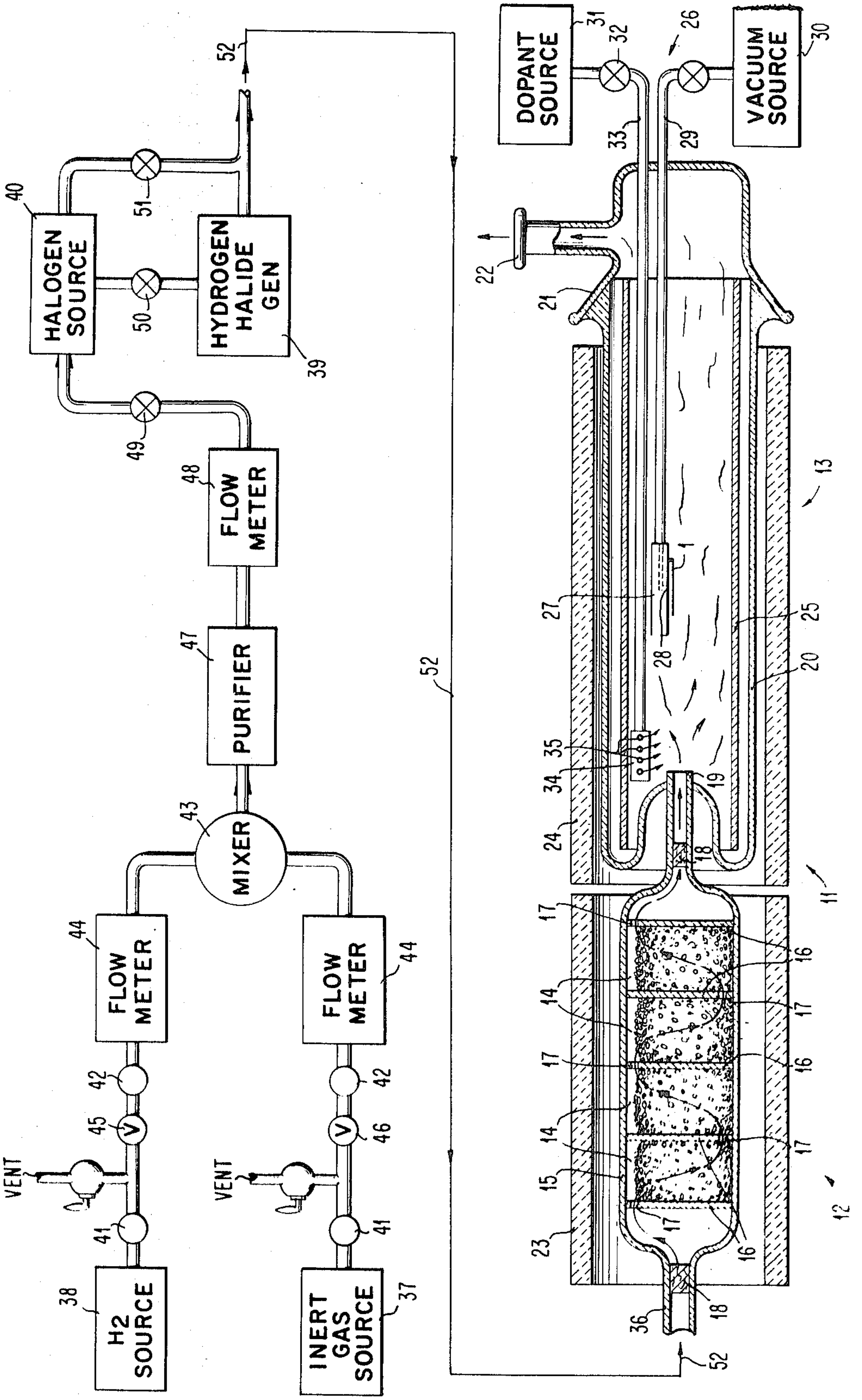
FIG. 2 is a partial block diagram cross sectional view of apparatus utilized in performing the method of the present invention.

The substrate is attached to a vacuum chuck or other suitable mounting and disposed downwardly within the deposition system shown in FIG. 2. This step is taken to protect the surface upon which deposition is to be made at the deposition site. Epitaxial films are subject to large spurious overgrowths or "spikes" which result from the nucleation of germanium about particles which flake off from the walls of the reaction tube in which deposition takes place.

STEP 7

Heating the substrate at temperatures in excess of the deposition temperature to achieve final cleaning.

This step is accomplished in the deposition system of FIG. 2 by heating the deposition site which contains the substrate to temperatures of 600° C. and 700° C. for gallium arsenide and germanium, respectively, in a reducing gas such as hydrogen for thirty minutes immediately prior to epitaxy.

STEP 8

Depositing p-doped germanium epitaxially on a substrate under conditions of velocity, germanium di-halide concentration and substrate temperature which result in essentially surface limited growth and minimized latent instabilities.

Referring now to FIG. 2, there is shown a partial block diagram cross-sectional view of the apparatus utilized in carrying out the deposition step of this method. An open tube disproportionation system is shown generally at 11, consisting of a germanium source bed 12 and a seed or deposition site 13. Germanium source bed 12 consists of pieces of crushed or pelletized germanium through which a desired gas or vapor may be passed. The crushed germanium is disposed within a plurality of chamber 14 which are formed within a quartz tube 15 by spaced apart quartz plates 16. Each of the quartz plates 16 has an aperture 17 disposed therein to permit inflowing gas or vapor to pass from one chamber to the next. Apertures 17 are disposed in staggered relationship in quartz plates 16 to cause the incoming gas or vapor to pass in serpentine fashion, as shown by the arrows passing through apertures 17 in FIG. 2, through germanium source bed 12. In this manner, under the conditions of high velocity and halogen or halide concentration which will be discussed more fully in what follows, equilibrium is achieved between the germanium source bed 12 and the disproportionatable germanium halide specie. In other words, a path through the germanium is set up which permits saturation of the incoming gas, which includes a halogen or a hydrogen halide, with germanium. Source bed 12 as shown in FIG. 2 is illustrative. In reality, a greater number of germanium filled chambers 14 are present to insure the saturation of the incoming gas with germanium.

The crushed germanium is retained in quartz tube 15 by quartz wool plugs 18. Quartz tube 15 at the right hand end thereof terminates in a necked-down nozzle portion 19 which is receivable in quartz tube 20 which is an element of deposition site 13. Quartz tube 20 is closed by a removable section 21 which has an exhaust port 22 disposed therein for the removal of residual gases. Quartz tubes 15, 20 are surrounded by furnaces 23, 24 respectively, which provide desired temperatures at source bed 12 and deposition site 13. The furnaces may be of any suitable type well known to those skilled in the deposition art. The temperatures desired may be controlled by thermocouples (not shown) which in conjunction with well-known circuit arrangements hold the furnaces at desired temperature values. A quartz liner tube 25 is shown in slidably engaging relationship with quartz tube 20. Liner tube 25 is utilized to facilitate cleaning of the system and is of such diameter that under the conditions of flow of vapor in deposition site 13 desired high velocities are attained.

A substrate 1 is shown positioned within deposition site 13 and inside of liner tube 25 by means of vacuum chuck 26. Vacuum chuck 26 consists of a substrate holder 27 which is made from a semi-cylindrical quartz tube having an aperture 28 disposed in the flat face of holder 27. The aperture 28 is 25 mils in diameter and a vacuum is applied to the aperture through quartz tubulation 29 which also acts as a support for holder 27. A vacuum pump 30 is connected to tubulation 29 and may be any suitable type well known to those skilled in the vacuum art. To insure retention of substrate 1 on the flat face of substrate holder 27, the flat face is lapped smooth during fabrication. The back surface of substrate 1 is also lapped to make certain close contact is attained between substrate 1 and the flat face of substrate holder 27.

To achieve p-doped germanium of suitable p-conductivity type, an impurity such as boron or gallium is introduced from dopant source 31, via valve 32 and tubulation 33 to an output tube 34 which contains a plurality of orifices 35. Output tube 34 is disposed adjacent nozzle portion 19 to insure thorough mixing of the dopant gas ($BI_3$ or $GaCl_3$) with the germanium halide containing gas from nozzle 19. Orifices 35 serve to diffuse the dopant gas and further insure mixing with the gas from nozzle 19. Output tube 34 and tubulation 33 may be made of quartz or any other suitable heat resistant material.

The gases utilized in the performance of the method of this invention are introduced into the left hand end of quartz tube 15 via a necked-down portion 36 from an inert gas source 37, a hydrogen source 38, a hydrogen halide generator 39 and a halogen source 40. High and low pressure regulators 41, 42 respectively, inserted in the flow line control the flow of gas to mixer 43 and flow meters 44 monitor the flow from gas sources 37 and 38. Inert gas source 37 may be a source of any inert gas such as argon or nitrogen, but in the preferred method of this invention helium is utilized. On-off valves 45, 46 are utilized in instances where one or the other of the gases hydrogen and helium is used alone. The gas or gases, as the case may be, pass through mixer 43 to purifier 47 where contaminants are removed. Flow meter 48 monitors the resulting flow which may pass through either halogen source 40 alone or pass to hydrogen halide generator 39 by the appropriate operation of on-off valves 49, 50, 51. The flow from either hydrogen halide generator 39 or halogen source 40 is then carried to germanium source bed 12 by way of tubulation 52 shown schematically in FIG. 2.

The system of FIG. 2 just described is operated in substantially the same manner as described in connection with the above identified co-pending patent application entitled "Semiconductor Preparation and Deposition Process" and as a matter of fact, where n-doped germanium layers are desired, nothing need be changed from that taught in the co-pending application.

In operation, the following ranges of parameters may be utilized to achieve germanium growth or deposition wherein the growth approaches surface limiting conditions. The apparatus of FIG. 2 is utilized and the parameters relate to a hydrogen-helium-hydrogen iodide-boron dopant system with the substrate upon which germanium is to be deposited preferably having a (110) orientation.

Germanium source bed temperature—550°–900° C.
Deposition site temperature—300°–500° C.
Iodine source temperature—>50°–90° C.
Equivalent hydrogen iodide pressure—>4–50.2 torr $$F=\frac{H_2}{(H_2+He)}\ 0-1$$

Gas stream velocity—>50 cm./min.–>450 cm./min.
Substrate—germanium or gallium arsenide
Growth rate—1–30 μ/hr.
Dopant—boron from $BI_3$ Where p-doped layers of germanium are required, the values of growth rate and substrate temperature are constrained and must be selected based on the following discovery and rationale:

During the fabrication of semiconductor devices using p-doped germanium epitaxial layers, it was discovered that devices which had been subjected to processing temperatures higher than the substrate temperature during deposition exhibited instabilities which led to their rejection. The instabilities were such that it appeared that an excess quantity of dopant (p-type) was introduced during deposition. The finished devices exhibited resistivities which were lower than the resistivity desired. A checking of the parameters such as growth rate and substrate temperature indicated that the instabilities might be eliminated by reducing growth rate. This expediency, however, caused adjustments in the system of FIG. 2 such that equilibrium conditions were achieved. The achievement of equilibrium conditions defeated the purpose of the system of FIG. 2 which is to achieve epitaxial germanium of a quality comparable to prior art high temperature reduction techniques by operating in the surface limited growth regime which is off-equilibrium. In other words, under equilibrium conditions, the system of FIG. 2 produces epitaxial layers which are not of the desired surface quality. Using another approach, that of increasing substrate temperature, the trend in resistivity change was favorable. As substrate temperature was increased, it was necessary to increase the vapor phase concentration of iodides and velocity to maintain surface limited deposition conditions. Increased flux, however, led to higher growth rates which appeared to be undesirable since the use of lower growth rates had already produced a favorable trend in reducing instabilities when deliberately imposed. The higher substrate temperatures surprisingly produced a marked decrease in the extent of resistivity change in the resulting epitaxial layer when compared with low growth rate conditions. Under the high growth rate conditions, however, system limitations resulted in some degradation of surface quality which, for small dimension devices, is undesirable. At this point, it should be apperciated that where high surface quality is not a criterion that the extent of resistivity change can be made quite small over a whole range of substrate temperatures and growth rates. Where, however, surface quality is a criterion the adherence to specific conditions, as shown hereinbelow, is necessary.

The trends discussed above which will be substantiated by examples, hereinbelow, indicated that good surface quality of depositions could not be easily achieved by adjustment of substrate temperature and flux. It became clear that the best that could be achieved would be to minimize the latent instabilities which were evidenced primarily by a departure in resistivity from a desired value. Accordingly, a range of operating conditions was arrived at which is a compromise between the desired high substrate temperature and low growth rates. Having approached the desired value of resistivity by appropriately adjusting deposition parameters to simultaneously achieve good surface quality, the final value of resistivity may be achieved by the final step in the process which is annealing.

Before discussing the annealing step, the following data in Table 1 shows the trends discussed above and defines the preferred operating conditions as far as the deposition of germanium is concerned. In Table I above, $I_2$ temperature is the temperature at which iodine source 40 in FIG. 2 is held. The temperature at which iodine, for example, is held determines the concentration of $GeI_2$ in the system. Iodide concentration increases with increasing iodine temperature. Ge source temperature in Table I is the temperature at which source bed 12 in FIG. 2 is held to insure maximum pick-up of germanium in a germanium halide specie form. Substrate temperature in Table I is the temperatures at which substrate 1 in FIG. 2 is held during deposition of germanium. Substrate 1 may be either germanium or gallium arsenide. Flow rate and the cross sectional area of the reactor determine the velocity of the mixed vapor of germanium iodine, hydrogen, helium and dopant in the region of substrate 1. The dopant utilized to provide the results of Table 1 was boron and was obtained from boron tri-iodide ($BI_3$) and appears as dopant

TABLE I

| | Temp., ° C. | | | | | | |
|---|---|---|---|---|---|---|---|
| Ex. | $I_2$ | Ge source | Substrate | Flow velocity, cm./min. | Growth rate, μ-hr. | Resistivity change | Surface quality |
| I | 65 | 600–620 | 350 | 190 | 5 | 10× | Good. |
| II | 85 | 600–620 | 375 | 190 | | 2.5× | Do. |
| III | 80 | 600–620 | 385 | 240 | 20 | 2× | Do. |
| IV | 80 | 600–620 | 392 | 275 | | 1.25× | Fair. |
| V | 85 | 600–620 | 400 | 300–440 | 25–30 | 1.1× | Poor. |
| VI | | 600–620 | 410 | | | 1.05× | Do. |

source 31 in FIG. 2. Growth rate in Table 1 is the rate at which germanium deposits epitaxially on substrate 1 in microns per hour. Resistivity change defines the departure due to latent instabilities of an epitaxially grown layer from a final desired value of resistivity. Thus, in Example I, after an annealing step, it was determined by measurements that the resistivity was an order of magnitude or approximately ten times lower than the resistivity prior to the annealing step. The initial resistivity of an as grown epitaxial layer under the condition of Example I is 0.20 ohm-cm., while the post-anneal resistivity is 0.02 ohm-cm. Surface quality in Table I is characterized as Good, Fair, or Poor, the first two being acceptable for the manufacture of high speed microminiaturized devices; the latter being unacceptable for such devices. It should be recalled that where surface quality is not a criterion, that epitaxial layers grown under the conditions of Examples I–VI can be used to produce useful devices such as diodes.

An overall consideration of Table I, indicates that resistivity change can be reduced to a minimum value at the higher substrate temperatures and that better resistivity control is achievable at the higher substrate temperatures and growth rates. A preferred range of substrate temperatures is between 370° C. and 390° C. because good surface quality epitaxy results at these substrate temperatures and associated growth rates. The preferred substrate temperature is 385° C. because the resistivity of the deposited germanium layer is only twice as high as the post-anneal resistivity and, good surface qualities are achievable because the flow rate and iodine concentration are not limited by overall system considerations.

While the instability present in the epitaxially deposited layer has been characterized as being evidenced by a change in resistivity, this characterization should not be considered limiting but merely descriptive. Other parameters such as mobility also change as a result of going from an unstable condition to a stable condition.

Using the parameters in each of the examples, epitaxial layers of germanium containing latent instabilities in different degrees are provided. The latent instabilities may be removed or eliminated by the final step in the process to produce stable epitaxial layer of germanium which can be subjected to further processing.

STEP 9

Annealing the substrate and epitaxial layer for a time and temperature sufficient to adjust the epitaxial layer to a final stable value.

This step is carried out by heating the substrate without removing the substrate from the deposition chamber. The annealing step is carried out in an atmosphere which is nonreactive with the deposited germanium layer. An inert gas such as helium or nitrogen may be used. Nonoxidizing gases such as hydrogen and forming gas may also be used. A preferred atmosphere is a 15% $H_2$–85% He mixture.

In general, annealing is carried out at a temperature higher than that of the substrate when deposition was carried out. Also, as the temperature increases, the time of annealing is shortened. Annealing apparently causes the p-type dopant to become electrically active by an internal rearrangement of the dopant in the germanium lattice.

In a preferred annealing step, heating is carried out at 500° C. in a 15% $H_2$–85% He atmosphere for at least 16 hours. After this amount of time, no further changes in resistivity can be detected by the usual measurements. However, using more refined techniques, second order resistivity changes can be detected after 32 hours of heating at 500° C. After 48 hours of heating, no further changes can be detected.

Annealing at 700° C. in a 15% $H_2$–85% He atmosphere for approximately 30 minutes or at 800° C. for approximately 15 minutes also produces stable epitaxial layers in which the resistivity change is complete.

Annealing at the higher temperatures is not preferred because of the possibilities of dissociation of gallium arsenide where gallium arsenide is used as a substrate and of the out-diffusion of dopants where germanium is used as a substrate.

It should be appreciated that deposition can be carried out under conditions which produce instabilities in the epitaxial layers to a degree such that they can be removed or eliminated by annealing alone. But in the lower range of substrate temperatures, below 375°, and high $GeI_2$ concentrations and high velocities the instability of the grown layer is such that it is extremely difficult to control the final boron doping level. Therefore in this lower substrate temperature range, while electrical stabilization may be approached after very long anneal periods (which may not be practical), the very large shift in resistivity prevents the predictable achievement of a stable resistivity at the 0.1Ω cm. level. Similarly, material grown at 375° or higher, after stabilization shows better electrical characteristics as evidenced by diffused diodes fabricated in such layers.

While the invention has been particularly described with reference to specific examples, thereof, it will be understood by those skilled in the art that various changes in procedures may be made therein without departing from the spirit of the invention.

What is claimed is:

1. A method for controlling latent instabilities in a p-doped epitaxial layer deposited on a substrate comprising the steps of:

introducing a germanium halide compound and a p-type dopant in the vapor phase at a deposition site at a velocity in a range of 50–450 centimeters per minute, at a concentration in terms of the vapor pressure of a hydrogen halide in a range of 5.0–50.2 torr and at a substrate temperature in the range of 300–500° C. to deposit a doped layer of germanium on said substrate, and annealing said substrate and said doped layer at a temperature in the range of 500–800° C. for a time period of 15 minutes to 48 hours, said time of heating decreasing with increasing temperature to change the resistivity of said layer to a stable value.

2. A method according to claim 1 wherein said substrate is a semiconductor and has a (110) crystallographic orientation.

3. A method according to claim 1 wherein said substrate temperature is in a range of 370–390° C., said given velocity is in a range of 190–450 centimeters per minute and said germanium halide concentration in terms of the vapor pressure of said hydrogen halide is in the range of 11–40 torr.

4. A method according to claim 1 wherein said substrate temperature is in a range of 370–390° C., said given velocity is in a range of 190–270 centimeters per minute, and said germanium halide concentration in terms of the vapor pressure of a hydrogen halide is in the range of 11–30 torr.

5. A method according to claim 1 wherein said substrate temperature is preferably 385° C., said given velocity is preferably 240 centimeters per minute and said germanium halide concentration in terms of the vapor pressure of said hydrogen halide is preferably 28 torr.

6. A method according to claim 1 wherein said substrate is a semiconductor selected from the group consisting of germanium and gallium arsenide.

7. A method according to claim 1 wherein said halide compound is germanium di-iodide, said hydrogen halide is hydrogen iodide and said p-type dopant is one selected from the group consisting of boron and gallium.

8. A method for controlling latent instabilities in a p-doped epitaxial layer deposited on a semiconductor substrate having a (110) orientation which is selected from the group consisting of germanium and gallium arsenide the steps of:

chemically treating said substrate to provide a fresh surface by immersing said substrate in a solubilizing solution said solution being a 3:1 solution of $H_2O$:NaOCl for germanium and a solution of $90H_2O_4$:$5H_2O_2$:$5H_2O$ for gallium arsenide, quenching the chemical treating by immersing said substrate which is immersed in said solubilizing solution in deionized water, rinsing said immersed substrate for 5 minutes in deionized water to remove all traces of said solubilizing solution, removing said substrate from deionized water within a moving stream of water, drying said substrate in a stream of nitrogen applied simultaneously with the removal of said moving stream of water, introducing said substrate face downwardly into an open-tube deposition system, heating said substrate in hydrogen for 30 minutes at a temperature of 700° C. for germanium and 600° C. for gallium arsenide, introducing p-type dopant in the vapor phase and a germanium halide compound which is in reactive equilibrium with a source bed of germanium and formed from a hydrogen, helium, hydrogen halide mixture which is capable of disproportionating in a region of said substrate in the vapor phase at a velocity in the range of 50–450 centimeters per minute at a concentration in terms of the vapor pressure of a hydrogen halide in a range of 5.0–50.2 torr and at a substrate temperature in the range of 300–500° C. to cause epitaxial deposition of a doped layer of germanium on said substrate, and annealing said substrate and said layer at a temperature in the range of 500–800° C. in a gaseous atmosphere which is nonreactive with said layer for a period of 15 minutes to 48 hours said time of heating decreasing with increasing temperature to change the resistivity of said layer to a stable value.

9. A method according to claim 8 wherein said germanium halide compound is germanium di-iodide, and said hydrogen halide is hydrogen iodide.

10. A method according to claim 8 wherein said substrate temperature is in a range of 370–390° C., said given velocity is in a range of 190–450 centimeters per minute and said germanium halide concentration in terms of the vapor pressure of said hydrogen halide is in a range of 11–40 torr.

11. A method according to claim 8 wherein said substrate temperature is in the range of 370–390° C., said given velocity is in a range of 190–275 centimeters per minute, and said germanium halide concentration in terms of the vapor pressure of a hydrogen halide is preferably in the range of 11–30 torr.

12. A method according to claim 8 wherein said substrate temperature is preferably 385° C., said given velocity is preferably 240 centimeters per minute and said germanium halide concentration in terms of the vapor pressure of said hydrogen halide is preferably 28 torr.

13. A method according to claim 8 wherein said p-type dopant is one selected from the group consisting of boron and gallium.

References Cited

UNITED STATES PATENTS

| | | | |
|---|---|---|---|
| 3,100,166 | 8/1963 | Marinace | 148—175 |
| 3,264,707 | 8/1966 | Elie | 148—175 |
| 3,310,425 | 3/1967 | Goldsmith | 148—175 |
| 3,312,571 | 4/1967 | Ruehrwein | 148—175 |
| 3,328,199 | 6/1967 | Sirtl | 148—175 |
| 3,354,004 | 11/1967 | Reisman | 148—175 |
| 3,473,976 | 10/1969 | Castrucci | 148—175 |

HYLAND BIZOT, Primary Examiner

U.S. Cl. X.R.

117—201